United States Patent Office 3,786,029
Patented Jan. 15, 1974

3,786,029
USE OF CERTAIN AMINOORTHOESTERS AS POLY-URETHANE CATALYSTS
Ibrahim S. Bechara, 1159 Naamans Creek Road, Boothwyn, Pa. 19061, and Dewey G. Holland, Box 503–B, R.D. 1, Chadds Ford, Pa. 19317
No Drawing. Filed Aug. 1, 1972, Ser. No. 276,976
Int. Cl. C08g 22/38, 22/46
U.S. Cl. 260—75 NC                       3 Claims

ABSTRACT OF THE DISCLOSURE

Aminoorthoesters are prepared from amino alkanols and orthoesters of the formula $R-C(OR')_3$. Such aminoorthoesters have utility as activators in polyurethane formation, as curing agents for epoxy resins, and in other uses. Advantageous properties include good stability, low odor, low toxicity and good activity in its use fields.

BACKGROUND OF THE INVENTION

(1) Field of the invention

This invention is concerned with particular aminoorthoesters, their preparation by reaction of suitable amino alkanols and orthoesters or by reaction of an alkali metal salt of an appropriate alkanol amine and an organic trihalide; and uses thereof, for example, as effective catalysts in the promotion of urethane reactions.

Review of Chemical Abstracts from 1920 on, Beilstein, the appropriate subclasses of United States patents, and the recent text "Carboxylic Ortho Acid Derivative Preparation and Synthetic Applications" by Robert H. De Wolfe, 1970 Academic Press, N.Y. failed to uncover the instant composition.

It is already known that synthetic polyurethane plastics, in particular foam plastics, can be produced by reacting compounds which contain active hydrogen atoms with polyisocyanates. The most important activators used, apart from organometallic compounds, are tertiary amines. However, it has been found that when using common tertiary amines as activators the cream time and the rise time of the foam as well as the gel time are often not satisfactory for technical purposes. Also many of the tertiary amines used as activators in the art suffer from disagreeable odor, toxicity and low flash point.

A new group of compounds has been found which has surprisingly proved to be highly effective as activators for the production of polyurethanes, in particular polyurethane foams from polyisocyanates and active hydrogen containing compounds. These compounds also have been found to be good curing agents for epoxy resins and when used in conjunction with peroxides they are good promoters for curing unsaturated polyesters. Of further value these compounds are good corrosion inhibitors and excellent scrubbers for acidic gases e.g. $SO_2$, $SO_3$, $H_2S$, $CO_2$, HCl and the like. These compounds have the advantage of low toxicity; low odor at least partly due to the high boiling point and low vapor pressure at ambient conditions; and relatively high thermal and excellent hydrolytic stabilities, as well as excellent activity at a wide range of concentration.

SUMMARY OF THE INVENTION

The present invention accordingly provides compounds of the general formula:

$$R-C(L)_x(OR')_{3-x}$$

where

R=H, $C_1$–$C_4$ alkyl, or phenyl
L=$(OCHR''CH_2)_yN(R''')_2$, L can independently differ in R'', y or R''' x=integer from 1–3
y=1 or 2
R'=$C_2$–$C_4$ alkyl (same or different)
R''=H, $CH_3$, $CH_2N(CH_3)_2$, independently when y=2
R'''=$C_1$ or $C_2$ or alkyl or aryl (same or different)

These compounds can be prepared from the desired alkanol amine and any orthoester of the general formula $R-C(OR')_3$, where R and R' are as described above, by transesterification of the alkoxy groups wholly or partially by the alkanol amine. The claimed compounds can also be made from the alkali (alkaline earth) metal salt of the alkanol amine and a suitable trihalide of the general formula $R-CX_3$ where R is as described above and X is halogen.

The orthoesters needed as reactants are those having the general formula $R-C(OR')_3$ where R and R' are as defined above. These compounds can generally be prepared from alkyl nitriles and alcohols by the Pinner method:

$$R-C\equiv N + HCl + 3R'OH \rightarrow R-C-(OR')_3 + NH_4Cl$$

or alternatively from alkyl trihalide and the alkoxides.

$$R-CX_3 + 3MOR' \rightarrow R-C-(OR')_3 + 3MX$$

where M is an alkali metal such as sodium, potassium, and lithium. Examples of orthoesters that can be prepared by the aforementioned methods are trimethyl orthoformate, triethyl orthoformate, trimethyl orthobenzoate, triethyl orthoacetate, and the like.

PREPARATION OF ORTHOESTERS

The preferred reaction for the preparation of orthoesters involves the alcoholysis of nitriles by the Pinner reaction $$R-C\equiv N + HCl + 3R'OH \rightarrow R-C(-OR')_3 + NH_4Cl$$

where R and R' are as defined above. The reaction is carried out at atmospheric pressure and generally in two separate steps. The first step involves the addition of one mol of anhydrous hydrogen chloride to one mol of the nitrile at a temperature range of 0–10° C. (slight excess of dry hydrogen chloride is preferred but not necessary). The second step involves the addition of three moles of the alcohol followed by heating for 6–28 hours at moderate temperatures such as in the range of from 30–40° C. Excess alcohol can be used and generally is preferred but it is not essential. Also a solvent, as for example diethyl ether, can be used but is not essential.

Another common method for the preparation of orthoesters involves the reaction of alpha, alpha, alpha substituted trihalide with metal alkoxide.

$$R-CX_3 + 3MOR' \rightarrow R-C(-OR')_3 + 3MX$$

where R and R' are as above; and X is halogen and M is an alkali (or alkaline earth) metal such as sodium, potassium, lithium, etc. The reaction is generally carried out at atmospheric pressure and in an alcoholic solvent. The alcohol employed as a solvent is generally that from which the alkoxide is derived. The temperature of the reaction is the boiling temperature of the alcohol employed. Mixed orthoesters can be obtained from this method by employing mixed metal alkoxide and/or mixed alcoholic solvents.

Still a third method is the tranesterification of a known orthoester with a desired alcohol.

$$R-C(OR')_3 + 3R''OH \rightarrow R-C(-OR'')_3 + 3R'-OH$$

This reaction is also carried at atmospheric pressure and a temperature range of 50–200° C. The preferred temperature is the reflux temperature of the alcohol used. The reaction is generally catalyzed by acids and usually the transesterification proceeds in such a manner where the higher boiling alcohol displaces the more volatile one.

A good review on the synthesis of orthoesters is found in a book by Post entitled "Aliphatic Orthoesters," Reinhold Publishing Corp., New York, 1943, pp. 11–44.

Th aminoalkanols that are suitable starting materials are those having the general formula $$H(OCHR''CH_2)_yN(R''')_2$$

where R'' and R''', and $y$ are as defined above. Examples of aminoalkanols that can be used according to this invention are the following:

N,N-dimethylethanolamine
N,N-diethylethanolamine
N-methyl N-ethylethanolamine
N,N-dimethyldiglycolamine

N-methyl N-ethyldiglycolamine
N,N-dimethylisopropanolamine(3-N,N-dimethylamino 2-propanol)
N,N-diethylisopropanolamine
N-methyl N-ethylisopropanolamine
2-[N,N-dimethylaminoisopropoxy]ethanol

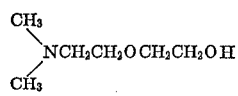

N-phenyl-N-methylethanolamine
1-methyl-2-[N,N-dimethylaminoisopropoxy]ethanol

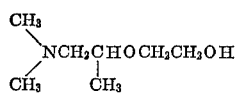

N,N-diphenylisopropanolamine
1-methyl-2-[N,N-dimethylaminoethoxy]ethanol

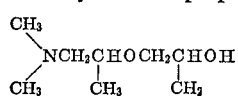

1,3-N,N,N',N'-tetramethylamino 2-propanol
1-N,N-dimethylamino 3-N',N'-diethylamino 2-propanol and others.

Synthesis of the novel aminoalkyl orthoesters involved may be effected by several methods. One such method is by the transesterification of appropriate orthoester with an appropriate alkanolamine.

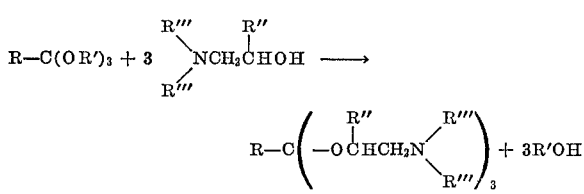

where R,R',R'',R''' are as previously defined. The reaction is preferably conducted at atmospheric pressure although a pressure range of 2 atm. to 50 mm. can be used. The reaction temperature is 70–200° C. with the preferred temperature of about 150° C. The reaction is effected preferably in the presence of an acid catalyst. The concestration of the catalyst can range from 0.1–10% by wt. of the alkanolamine charged. The preferred concentration is about 2% by wt. of the alkanolamine. The catalysts can be mineral acid, such as hydrochloric, sulfuric and the like; organic acids such as cyano acetic, p-toluene sulfonic and the like; or a Lewis acid such as aluminum chloride, magnesium chloride, boron trifluoride, stannic chloride, molecular iodine, and the like. The preferred catalyst are boron trifluoride etherate and anhydrous stannic chloride.

The reaction can be effected in an inert solvent such as diglyme but it is preferred not to use any solvents.

Another method by which these aminoalkyl orthoesters can be prepared is by the reaction of the metal alkoxide of the alkanolamine with alpha, alpha, alpha substituted trihalide.

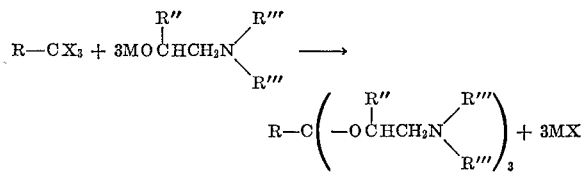

where X is halogen and M is alkali (or alkaline earth) metal such as sodium, potassium, lithium and the like, and R, R'' and R''' are as previously defined. This reaction is effected at about atmospheric pressure and at a temperature in the range of 30–100° C. The preferred temperature is about 40° C. Excess alkanolamine can, and is preferred to be used as a solvent. Other solvents, substantially inert in the reaction system such as hexane, heptane, benzene and the like, may be used.

The aminoorthoesters according to the invention may be used as activators for polyurethane formation by themselves or in combination with previously known activators, particularly metal-organic compounds, such as tin octoate or dibutyltin dilaurate or lead naphthenate. Also, the aminoorthoesters of the invention may be used to advantage in combination with other amine activators such as triethylenediamine and bis-[dimethylaminoethyl] ether, particularly in the production of highly resilient polyurethane foams.

The aminoorthoesters, as activators, can be used with tetravalent and pentavalent organic phosphorus compounds such as phospholines, phospholine oxides, tertiary phosphines and cyclic esters, amides and ester amides of phosphorous and phosphoric acid for built-in flame retardancy characteristics of the polyurethane products.

A typical formulation for the production of polyurethane resins or foams includes (1) compounds which contain active hydrogen atoms
(2) polyisocyanates
(3) additives such as blowing agents, emulsifiers, surfactants, fire retardants, fillers, pigments and others.

Compounds which contain active hydrogen atoms are those polyols having at least two active hydrogens. The term active hydrogen atoms refers to hydrogen atoms which, because of their position in the molecules, display activity according to the Zerewitinoff test as described by Kohler in J. Am. Chem. Soc. 49, 3181 (1927).

Polyisocyanates which may be used as precursor material according to the invention are those known aliphatic, cycloaliphatic, araliphatic, and aromatic polyisocyanates and their thio analogs. Examples of these are the 2,4- and 2,6-toluene diisocyanates and mixture of the two isomers; bis-(4-isocyanatophenyl)methane and higher molecular molecular weight products produced by the phosgenation of aniline/formaldehyde condensation products; bis-(2-isocyanato fumarate); 1,5-naphthalene diisocyanate; xylylene diisocyanates; benzyl diisocyanate; triphenyl methane-4, 4'4''-triisocyanate; xylylene-alpha-alpha-diisothiocyanate; and the like.

Further included are dimers and trimers of diisocyanates and polyisocyanates and compounds of the general formula $M(NCO)_x$ where $x$ is one or more and M is a monofunctional or polyfunctional atom or group. Examples of this type of compound include ethyl phosphoric diisocyanate, $C_2H_5\ P(NCO)_2$; phenyl phosphorous diisocyanate; and diisocyanates derived from disulfonamide $M(SO_2NCO)_2$, where M is as defined above.

Also a suitable starting material for the production of polyurethanes in the process according to the invention are the so-called prepolymers which are the reaction products of the polyols with excess polyisocyanates. Also to be included are the polymerized isocyanates containing isocyanurate rings.

Furthermore, the compounds according to the invention have a catalytic effect both with polyether polyols in which the terminal secondary hydroxyl groups have been converted into primary hydroxy groups by the addition of ethylene oxide and with polyether polyols in which the modification with ethylene oxide has been achieved in any desired manner by block polymerization or copolymerization within the chain. The same applies to polyethers modified with alkylene oxide within the chain or at the end of the chain.

Illustrative hydroxy-terminated polyesters are those which are prepared by polymerizing a lactone (preferably, an epsiloncaprolactone) in the presence of an active hydrogen-containing starter as disclosed in U.S. Pats. Nos. 2,914,556; 2,890,208; 2,878,236; and 2,977,385. Polyesters from adipic acid and diols such as ethylene glycol, propylene glycol, diethylene glycol, and the like, and triols such as 1,1,1-trimethylolpropane, glycerol, and others, are also useful. Copolymers of lactones and alkylene oxides such as those described in U.S. Pat. No. 2,962,524, can also be used with good results.

Illustrative polyhydroxyalkanes include, among others, ethylene glycol, propylene glycol, 1,3-dihydroxybutane, glycerol, 1,2,6 - trihydroxyhexane, 1,1,1 - trimethylolpropane, pentaerythritol, sorbitol, and the like. The alkylene oxide adducts of the above-exemplified polyhydroxyalkanes can also be employed, preferably the ethylene oxide, propylene oxide, the epoxybutane, the epichlorohydrin, or mixtures thereof, adducts of said polyhydroxyalkanes.

Another useful class of polyols which can be employed are the trialkanolamines and the alkylene oxide adducts thereof. Illustrative trialkanolamines include triethanolamine and triisopropanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms, for example, ethylene oxide, 1,2-epoxypropane, the epoxybutanes, and mixtures thereof. Mono- and polyamines suitable for reaction with alkylene oxides include, among others, ethylamine, benzylamine, aniline, ethylenediamine, diethylenetriamine, 1,3 - butanediamine, phenylenediamines, toluenediamine, and the like. Others which deserve particular mention are the alkylene oxide adducts of aniline or substituted-aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, and the like, polyol glycosides such as ethylene glycol glucoside, propylene glycol glucoside, and the like.

Another desirable class of polyols are the alkylene oxide adducts, preferably with ethylene oxide, such as 1,2-epoxypropane, epoxybutane, and mixtures thereof; or adducts of aromatic amine/phenol/aldehyde ternary condensation products. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, the polyphosphoric acids such as tripolyphosphoric acid, and the like are desirable for use in this connection. Also useful are phosphites such as tris-(dipropylene glycol) phosphite and the phosphonates which can be produced therefrom by heating in the presence of, e.g., butyl bromide, as well as the alkylene oxide adducts thereof.

The polyol or polyol mixture employed can have hydroxyl numbers which vary over a wide range. In general, the hydroxyl numbers of the polyols employed in the invention can range from about 20, and lower, to about 1000, and higher. The hydroxyl number is defined as the number of milligrams of potassium hydroxide required for the complete neutralization of the hydrolysis product of the fully acetylated derivative prepared from 1 gram of polyol. The hydroxy number can also be defined by the equation:

$$OH = \frac{56.1 \times 1000 \times f}{M.W.}$$

where:

OH = hydroxy number of the polyol
$f$ = average functionality, that is, average number of hydroxyl groups per molecule of polyol
M.W. = average molecular weight of the polyol The exact polyol employed depends upon the end-use of the polyurethane product of the process of the invention. For example, when used to prepare foams, the functionality and the hydroxyl number are selected properly to result in flexible, semi-flexible, or rigid foams. The above polyols preferably possess a hydroxyl number of from about 200 to about 800 when employed in rigid foam formulations, from about 40 to about 250 for semi-flexible foams, and from about 20 to about 70 or more when employed in flexible foam formulations. Such limits are not intended to be restrictive, but are merely illustrative of the large number of possible combinations of the above polyol coreactants.

Suitable blowing agents are compounds that liberate gases such as nitrogen, e.g., azo compounds or sulphonyl azides; compounds that liberate $CO_2$, e.g., $RNHCO_2H$ and/or

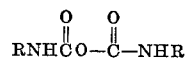

formed in situ from the reaction of water and polyisocyanates; low boiling hydrocarbons such as ethane, propane, hexane or heptane and their halogenation products, e.g., halogenated methanes or ethanes, chlorofluoromethanes, ethylene dichloride and vinylidene chloride.

The usual emulsifiers and foam stabilizers may be used as additives to facilitate the mixing and foaming reactions. These additives include higher alkyl or aryl sulfonic acids and their salts. Sulfuric acid esters of castor oil or of vicinoleic acid and their salts; oleic acid salts or stearic acid salts; silicone oils which contain basic groups; and mixed condensation products which contain siloxane and alkylene oxide groups. Also, dyes, fillers and plasticizers may be included.

DETAILED DESCRIPTION OF THE INVENTION

A preferred route to a preferred aminoorthoester product is:

Another route is:

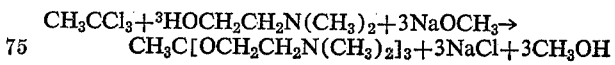

Among the compounds prepared are

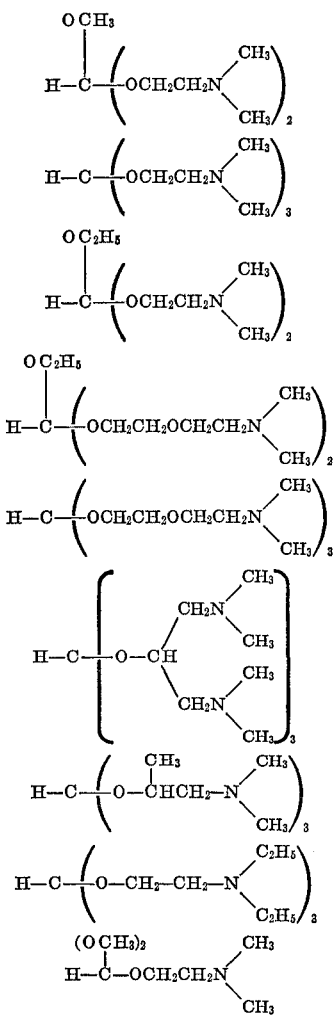

Other appropriate aminoorthoester compositions include:

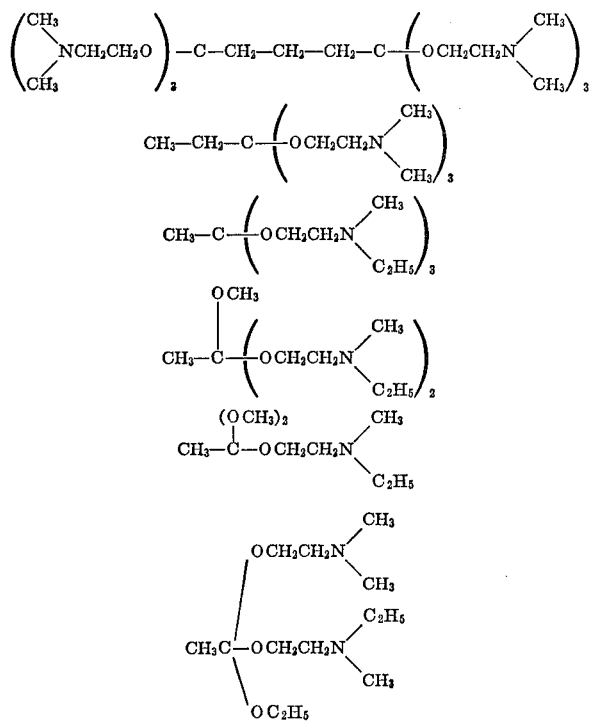

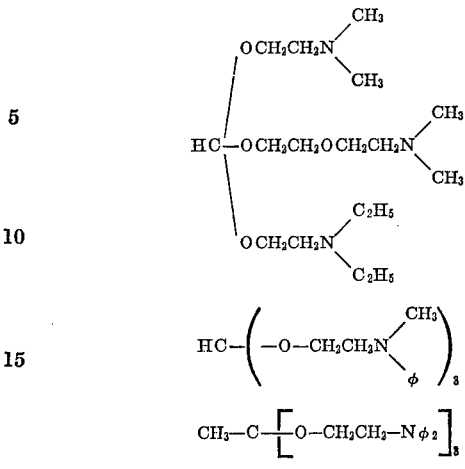

EXAMPLE I

A mixture of 10.6 g. (0.1 mole) of methyl orthoformate, 27 g. (0.3 mole) of DMEA and 0.3 g. of p-toluene sulfonic acid was refluxed for several days then subjected to atmospheric distillation. The first cut collected had a boiling range of 60–138° C. It consisted mainly of methanol, methyl orthoformate and DMEA. The remaining product was subjected to vacuum distillation. Two cuts were obtained. Cut #1 distilled at 95–100° C. and 3.0 mm./Hg. It was identified by NMR spectroscopy to be methoxy bis DMEA formate. Cut #2 distilled at 135° C. and 3.0 mm./Hg and it was identified to be the tris DMEA formate.

*Elemental analysis.*—Calculated for $C_{13}H_{31}N_3O_3$ (percent): C. 56.30; H, 11.19; N, 15.16. Found (percent): C, 55.75; H, 11.49; N, 14.95.

EXAMPLE II

A mixture of 14.7 g. (0.1 mole) of triethyl orthoacetate, 26.5 g. of DMEA (0.3 mole) and 0.5 cc. of concentrated hydrochloric acid was co-distilled under 25 theoretical plates fractionation column. A total of 25 g. of ethanol and starting material was distilled at atmospheric pressure. The remainder was subjected to vacuum distillation; 12 g. of product were distilled at 110–115° C. and 1.0 mm./Hg. Its structure was proven by NMR to be the tris DMEA orthoacetate.

*Elemental analysis.*—Calculated to $C_{12}H_{33}N_3O_3$ (percent): C, 57.73; H, 11.34; N, 14.43. Found (percent): C, 57.71; H, 11.54; N, 14.12.

EXAMPLE III

A mixture of 14.8 g. (0.1 mole) of triethyl orthoformate and 39.9 g. (0.3 mole) of N,N-dimethyldiglycol amine was heated under a reflux condenser in presence of trace amount of acid for 1 hour. The ethanol formed was distilled off and the residue was subjected to vacuum distillation.

Cut #1 distilled at 60° C. and 1.0 mm./Hg, and was mostly starting material. Cut #2 distilled at 165–170° C. and 4 mm./Hg. Cut #3 distilled at 195° C. and 1.0 mm./Hg.

Cut #2 was identified by NMR to be ethoxy bis-(N,N-dimethyldiglycolamine formate, R.I. at 27° C.=1.4422.

*Analysis.*—Calculated for $C_{15}H_{35}N_2O_5$, wt. percent: C=55.90; H=10.56; N=8.69. Found wt. percent: C=56.24; H=10.88; N=9.03.

Cut #3 was analyzed for $C_{19}H_{43}N_3O_6$:

Calculated, wt. percent: C, 55.88; H, 10.54; N, 10.20. Found, wt. percent: C, 55.09; H, 11.06; N, 9.87. R.I. at 27° C.=1.4496.

EXAMPLE IV

A mixture of 14.8 g. (0.1 mole) of triethyl orthoformate and 26.7 g. (0.3 mole) of DMEA was refluxed in presence of few drops of concentrated HCl for two hours. The ethanol and unreacted material were removed by distillation at atmospheric pressure. The residue was subjected to vacuum distillation to give two cuts. Cut #1 distilled at 90–95° C. at 1 mm./Hg; and Cut #2 weighed 12 g. and distilled at 130–135° C. at 3 mm./Hg pressure.

Cut #2 was identified as tris DMEA formate:

Analysis.—Calcd. for $C_{13}H_{31}N_3O_3$ (percent): C=56.30; H=11.19; N=15.16. Found (percent): C=56.10; H=11.17; N=14.49.

Cut #1 was identified as the ethoxy bis-[dimethylaminoethoxy]formate. R.I. at 27° C.=1.4305.

Analysis.—Calcd. for $C_{11}H_{26}N_2O_3$ (percent): C=56.41; H=11.11; N=11.96. Found (percent): C=55.65; H=10.62; N=11.90.

EXAMPLE V

A mixture of 0.3 mole (43.8 g.) of 1,3-N,N,N',N'-tetramethylamino 2-propanol and 0.1 mole (14.8 g.) of triethylorthoformate was heated at 150° C. in presence of 0.1 cc. of concentrated hydrochloric acid. The ethanol formed was continuously removed over a fractionation column. When the pot temperature reaches 200° C. the reaction was cooled and connected to a vacuum line and distilled. Cuts #1 and 2 distilled from 50–145° C. and 3.0 mm./Hg. Cut#3 distilled at 160–163° C. and 1.0 mm./Hg. Its weight was 5 g. and was identified by I.R. and NMR spectroscopy to be the tris-[N,N,N',N'-tetramethylamino-2-propoxy]formate. R.I. at 15° C.=1.4635.

Analysis.—Calcd. for $C_{22}H_{52}N_6O_3$ (percent): C=58.93; H=11.61; N=18.75. Found (percent): C=58.53; H=11.58; N=18.14.

EXAMPLE VI

A mixture of 0.3 mole (50 g.) of triethyl orthoformate and 1.0 mole (103 g.) of N,N-dimethylisopropanol amine was heated in presence of 0.1 g. of p-toluene sulfonic acid. The ethanol formed was continuously removed till the temperature of the pot reached 230° C. The reaction mixture was then cooled and connected to a vacuum line, then distilled. The first cut weighed 124 g. and it distilled from 60–130° C. and 4 mm./Hg. Cut #2 weighed 15 g. and it distilled from 130–133° C. and 4 mm./Hg. This latter cut was identified by I.R. and NMR to be the tris-[dimethylaminoisopropoxy]formate. R.I. at 27° C=1.4355.

Analysis.—Calcd. for $C_{16}H_{37}N_3O_3$ (percent): C=60.19; H=11.60; N=13.17. Found (percent): C=59.41; H=11.57; N=13.44.

EXAMPLE VII

In a round bottomed flask equipped with a thermowell, the following materials were charged:

106 g. (1.0 moles) of trimethylorthoformate
320 g. (3.6 moles) of dimethylethanolamine
5 g. of boron trifluorideetherate The flask was placed in a heating jacket and connected to a 25 theoretical plate fractionation column with a takeoff distilling head. The pot was heated and the methanol formed was continuously removed. When the theoretical amount of methanol was removed, the heating was continued and part of the excess DMEA distilled off. The heat was turned off when the pot temperature reached 400° F. The pot was cooled and transferred to vacuum distillation where the remaining excess of DMEA were removed at about 30° C. and 1 mm./Hg. Tris-[dimethylaminoethyl] formate distilled at 105–110° C. and 1 mm./Hg. It weighed 231 g. or 83% of the theoretical. The odor at prevailing room conditions was relatively slight and less offensive than most amines, and considerably less offensive than that of the alkanolamine from which it was derived. The flash point of the product was high.

EXAMPLE VIII

A mixture of 10.6 g. (0.1 mole) of trimethyl orthoformate, 27 g. (0.3 mole) of dimethylethanolamine, and 0.5 g. of p-toluene sulfonic acid was heated under a reflux condenser. The reaction was followed by G.C. at intervals of four hours. After 26 hours, the reaction mixture reached equilibrium. The mixture was then set up for distillation and the methanol formed as well as the unreacted materials were distilled at atmospheric pressure and a temperature range of 60–135° C. The remaining mixture was subjected to vacuum distillation using ~10 plate fractionation column. Three cuts were obtained.

Cut #1 distilled at 47–53° C. and 8 mm./Hg. R.I. at 13° C.=1.4215.

It was identified by I.R. and NMR spectroscopy to be the bis-methoxy[dimethylaminoethoxy]formate.

Cut #2 distilled at 95–100° C. and 3 mm./Hg. R.I. at 25° C.=1.4319.

It was identified by I.R. and NMR spectroscopy to be methoxy bis-[dimethylaminoethoxy]formate.

Cut #1 analyzed for $C_nH_{17}N_1O_3$

Calculated, wt. percent: C, 51.53. H, 10.43. N, 8.60. Found, wt. percent: C, 50.97. H, 9.76. N, 8.91.

Cut #2 analyzed for $C_{10}H_{24}N_2O_3$

Calculated, wt. percent: C, 54.55; H, 10.91; N, 12.73. Found, wt. percent: C, 54.32; H, 10.92; N, 13.05.

EXAMPLE IX

In a 1 liter round bottomed flask equipped with a thermowell, the following materials were mixed:

420 g. of N,N-diethylaminoethanol
113 g. of trimethylorthoformate
11 g. of boron trifluoride The flask was set under 25 theoretical plate fractionation column equipped with a takeoff distilling head and a reflux condenser. The reflux to takeoff ratio was set 5:1. The mixture was heated and the methanol formed was continuously removed. After the theoretical amount of methanol was removed, excess diethylaminoethanol was distilled off. The distillation was stopped when the pot temperature reached 400° F. The residue was subjected to vacuum distillation and yielded the following cuts. Cut #1 weighed 85 g. and distilled at 35° C. and 1 mm./Hg. It was identified to be the starting diethylaminoethanol. Cut #2 weighed 42 g. and distilled at 82° C. and 1 mm./Hg. It was not identified. Cut #3 weighed 218 g. and distilled at 150–155° C. and 2 mm./Hg. R.I. at 28° C.=1.4474.

This cut was identified by I.R. and NMR spectroscopy as the tris-(N,N-diethylaminoethoxy) formate.

Analysis.—Calculated for $C_{19}H_{43}N_3O_3$, wt. percent: C, 63.20; H, 11.91; N, 11.63. Found, wt. percent: C, 63.42; H, 11.63; N, 12.15.

EXAMPLE X

The preparation of several comparative samples of polyurethane rigid foam utilized a formulation comprising
A. a mixture of 109 g. of Selectrofoam (rigid foam polyol), 47 g. of R–11SBA (Freon) blowing agent, 1.5 g. of DC–193 surfactant;
B. a mixture of 0.12 g. of D–22(dibutyl tin dilaurate) added to 105 g. of Hylene TIC (diisocyanate);
C. amine catalyst as shown below. The materials were then mixed with a high speed mechanical stirrer for 10 seconds, then poured into a five quart tub.

The cream, gel, rise and tack free times for each sample were measured. Table 1 shows typical gel and rise times as well as cream and tack free times for the various amine catalysts.

TABLE 1

| Catalyst, concentration in grams: | | | | | | |
|---|---|---|---|---|---|---|
| Dimethylethanolamine | 0.8 | 1.0 | | | | |
| Tris-(dimethylaminoethyl)-formate | | | 0.8 | 1.0 | | |
| Methoxy bis dimethylethanolamine | | | | | 0.8 | 1.0 |
| Cream time (secs.) | 16 | 12 | 12 | 10 | 10 | 10 |
| Gel time (secs.) | 118 | 51 | 35 | 33 | 35 | 35 |
| Rise time (secs.) | 265 | 165 | 63 | 63 | 72 | 60 |
| Tack free time (secs.) | 222 | 165 | 47 | 45 | 55 | 56 |
| Tub density | | | | 1.61 | 1.58 | 1.61 | 1.57 |

EXAMPLE XI

A mixture of 100 g. of CP-3000 polyol, 3.5 g. of water, 1.0 g. of DC-190 surfactant and 0.15 g. of amine catalyst were thoroughly blended. To this mixture was added 0.25 g. of 50 wt. percent T-9 tin catalyst in CP-3000. 43.5 g. of toluene diisocyanate 80/20 were then added and the material mixed with a high speed mechanical stirrer for 10 seconds. The mixture was then poured into a five quart tub and the cream, hard gel and rise times were recorded. Table 2 shows typical data obtained with the various amine catalysts.

TABLE 2

| Catalyst, concentration in grams: | | | | |
|---|---|---|---|---|
| Dimethylethanolamine | 0.15 | | | |
| Tris-dimethylethanolamine formate | | 0.15 | | |
| Methoxy bis-dimethylethanolamine formate | | | 0.15 | |
| Triethylenediamine | | | | 0.15 |
| Cream time (secs.) | 13 | 13 | 12 | |
| Hard gel (secs.) | 128 | 135 | 98 | |
| Rise time (secs.) | Collapsed | 110 | 113 | 87 |

EXAMPLE XII

A mixture of 100 g. of polyester polyol (Fomrez 50), 3.6 g. water, 1.5 g. of Witco 1058 and 7786 surfactants, catalyst as indicated below, and 105 g. of toluene diisocyanate 80/20 was mixed for 10 seconds with a high speed mechanical stirrer, then poured into a five quart tub. Table 3 lists the cream and hard gel times obtained with the various catalysts.

TABLE 3

| Catalyst, concentration in grams: | | | |
|---|---|---|---|
| N-ethyl morpholine | 1.8 | | |
| Tris-dimethylethanolamine formate | | 0.8 | 1.0 |
| Cream time (secs.) | 13 | 10 | 8 |
| Hard gel (secs.) | 148 | 85 | 60 |
| Rise time (secs.) | 76 | 60 | 44 |

EXAMPLE XIII

The effective nature of such an aminoorthoester with an epoxide is demonstrated. A mixture of 10 parts by weight of glycidyl polyether (Epon 828) and 1 part by weight of tris dimethylethanolamine (from Example I, Cut #2) were handmixed for 2 minutes and then heat cured. The cure time at each of several temperatures is shown in Table 4.

TABLE 4

| Temperature ° C.: | Cure time in minutes |
|---|---|
| 27 | 240 |
| 50 | 55 |
| 80 | 16 |
| 100 | 13 |
| 135 | 12 |

Obviously, many modifications and variations of the invention as hereinbefore set forth may be made without departing from the spirit and scope thereof. Therefore, only such limitations should be imposed as are indicated in the appended claims.

What is claimed is:

1. In the preparation of polyurethane compositions from formulations comprising at least one polyol having a minimum of 2 active hydrogen per molecule and a reactive organic isocyanate, the improvement of activating the formation of the polyurethane composition by including in the formulation an effective activating amount of an aminoorthoester in accordance with the formula $$R—C(L)_x(OR')_{3-x}$$

where

R is a radical selected from the group consisting of hydrogen, an alkyl group of 1 to 4 carbon atoms and a phenyl, L is $(OCHR''CH_2)_y N(R''')_2$, 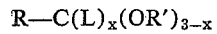

$x$ is an integer from 1 to 3, $y$ is an integer from 1 to 2, $R'$ is an independently selected alkyl radical of 1 to 4 carbons, $R''$ is a radical independently selected from the group consisting of hydrogen, $CH_3$ and $CH_2N(CH_3)_2$, and $R'''$ is a radical independently selected from the group consisting of an alkyl group of 1 to 2 carbon atoms and phenyl.

2. The formulation in accordance with claim 1 wherein said polyol is polyether polyol.

3. The formulation in accordance with claim 1 wherein said polyol is polyester polyol.

References Cited

UNITED STATES PATENTS

| | | | |
|---|---|---|---|
| 2,753,276 | 7/1956 | Brockhagen et al. | 260—75 NC |
| 2,913,425 | 11/1959 | Mueller et al. | 260—75 NC |
| 3,634,516 | 1/1972 | Nazy et al. | 260—584 C |
| 3,661,993 | 5/1972 | Kuder et al. | 260—584 C |
| 3,694,510 | 9/1972 | Moller et al. | 260—75 NC |

DONALD E. CZAJA, Primary Examiner

H. S. COCKERAM, Assistant Examiner

U.S. Cl. X.R.

260—2.5 AC, 77.5 AC, 571, 584 C